_United States Patent_ [19]

Vieceli et al.

[11] 4,197,791

[45] Apr. 15, 1980

[54] ELECTRIC STEAMER

[75] Inventors: Joseph L. Vieceli, La Grange; James C. Mysicka, Berwyn, both of Ill.

[73] Assignee: Sunbeam Corporation, Chicago, Ill.

[21] Appl. No.: 969,633

[22] Filed: Dec. 14, 1978

[51] Int. Cl.² ............................................. A47J 37/06
[52] U.S. Cl. .................................... 99/339; 99/341;
99/441; 99/448; 99/450; 99/467; 126/369;
D7/94; D7/85
[58] Field of Search ................ 99/339, 467, 341, 441,
99/450, 448; 126/369; D15/106; D7/85, 94

[56] References Cited

U.S. PATENT DOCUMENTS

| | | | |
|---|---|---|---|
| D. 122,260 | 9/1940 | Dickey | D7/87 |
| D. 124,305 | 12/1940 | Christenson | D7/87 |
| D. 127,906 | 6/1941 | Faunce | D7/87 |
| D. 140,802 | 4/1945 | Sharpe | D7/85 |
| D. 187,835 | 5/1960 | Lee | D7/97 |
| D. 190,982 | 7/1961 | Boldt | D7/94 |
| D. 191,025 | 8/1961 | Frost | D7/94 |
| 221,407 | 11/1879 | Harrison | D7/88 |
| D. 243,059 | 1/1977 | Hoffschneider | D7/97 |
| D. 244,172 | 5/1977 | Lee | D7/85 |
| 2,405,984 | 8/1946 | Sharpe | 99/358 |
| 2,469,778 | 5/1949 | Morici | 99/339 |
| 2,562,723 | 7/1951 | Keller | 99/339 |
| 2,818,794 | 1/1958 | Aslesen | 99/341 |
| 3,682,664 | 8/1972 | Bennett | 99/339 |

_Primary Examiner_—Billy J. Wilhite
_Attorney, Agent, or Firm_—George R. Clark; Neil M. Rose; Robert J. Fox

[57] ABSTRACT

An electric steamer for simultaneously steaming a frankfurter and warming an accompanying frankfurter bun is disclosed herein. The steamer includes a base portion having an electric heater and a reservoir adapted to receive a small amount of water for steaming the frankfurter and steam-warming the frankfurter bun. A perforated support rack is positioned over the reservoir for supporting the frankfurter, a sausage, or the like above the water. A bun-supporting cover is removably mountable over the reservoir to define a steaming chamber. The cover has a top wall provided with a plurality of steam vents whereby the steam which cooks the frankfurter escapes through the steam vents and warms and softens the frankfurter bun supported on the upper surface of the cover.

19 Claims, 4 Drawing Figures

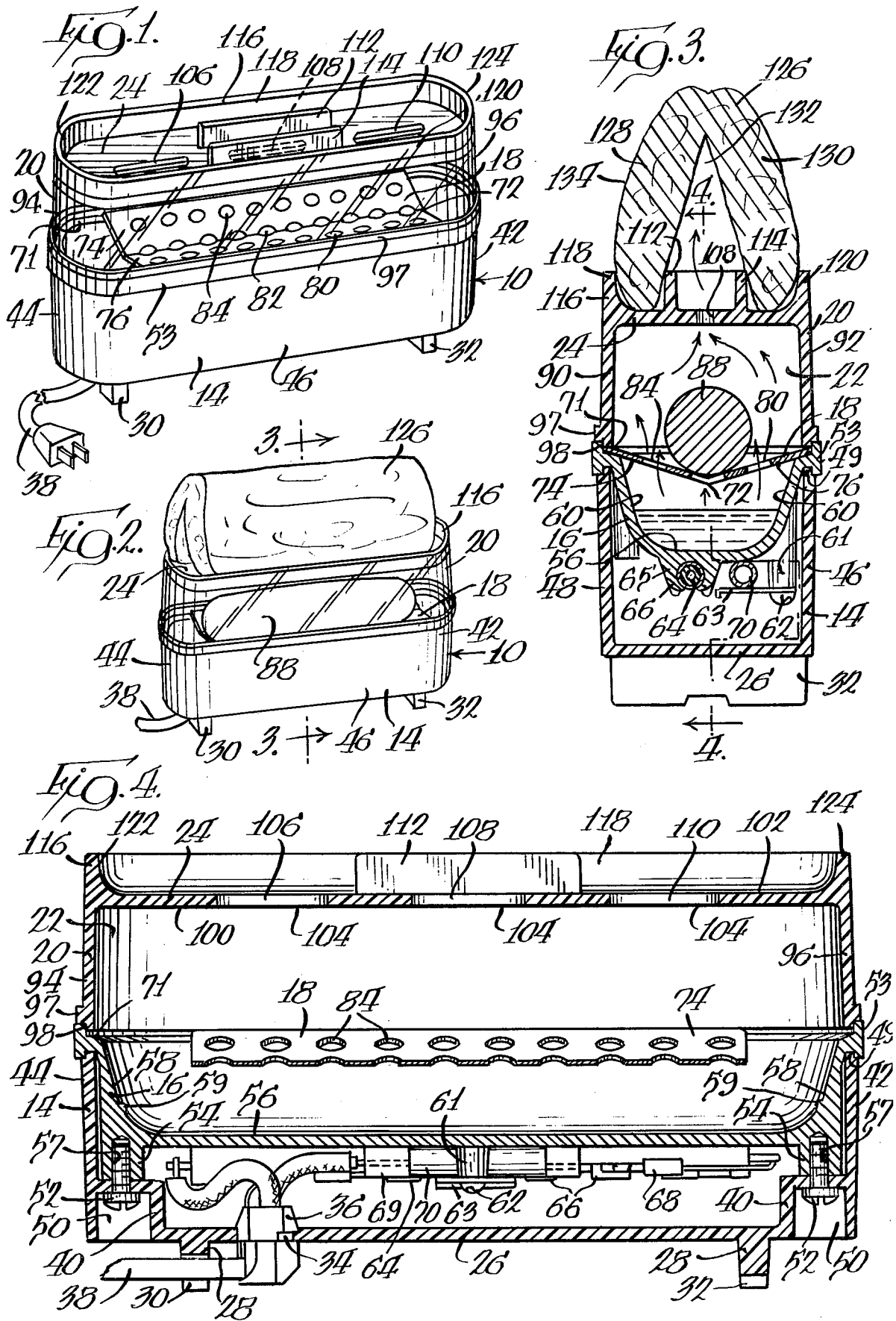

ELECTRIC STEAMER

BACKGROUND OF THE INVENTION

Frankfurter steamers and the like are well-known in the art. It is known that frankfurters can be cooked with steam while the steam is also used to steam-warm the bread or bun on which the frankfurter is placed in order to create a pleasing and inexpensive food. While commercial food steaming equipment is available, steamers for use by the general public which can steam relatively small amounts of food were, until recently, not generally available.

The necessity of using a relatively large piece of equipment with accompanying cleanup difficulties, large use of energy, and use of fluids to cook one or two frankfurters is a well-known problem with present day equipment. It is, therefore, desirable to have a steamer which can steam several frankfurters at a time, is relatively compact, is easy to clean, and occupies a small amount of storage space.

SUMMARY OF THE INVENTION

An electric steamer for cooking frankfurters while simultaneously steam-warming the buns is herein disclosed. The steamer includes a base having a reservoir mounted thereon. The reservoir is adapted to receive a relatively small amount of water. An electric heating element is affixed to the reservoir and adapted to heat the water in the reservoir. A perforated support rack rests across the reservoir for holding one or two frankfurters. A vented clear plastic cover is adapted to fit over the perforated support rack and enclose the reservoir. The interior of the vented cover and the reservoir define a steam chamber which traps a portion of the steam generated by heating the water in the reservoir. The steam cooks the frankfurter or sausage resting upon the perforated support rack. In addition, the vented cover also has a top wall having a pair of spreader ribs positioned parallel to one another and equidistantly spaced from an upstanding peripheral rim. A plurality of steam vents is positioned between the spreader ribs. The spreader ribs are adapted to hold a frankfurter bun slightly open and allow the vapor which escapes from the cover through the steam vents to steam-warm the frankfurter bun while the frankfurter is being steamed inside the steam chamber.

It is a principal object of the present invention to provide an electric steamer which is adapted to steam several frankfurters and simultaneously steam-warm a frankfurter bun supported above the frankfurter.

It is another object of the instant invention to provide an electric steamer which is compact and requires only small amounts of water and electric power to steam the frankfurter and soften the frankfurter bun.

It is still another object of the present invention to provide an electric steamer which is inexpensive to manufacture and easy to clean.

Other objects and uses of the present invention will become obvious to one skilled in the art upon perusal of the following specification and claims in light of the accompanying drawings.

BRIEF DESCRIPTION OF THE DRAWING

FIG. 1 is a perspective view of an electric steamer embodying the present invention;

FIG. 2 is a perspective view on a slightly smaller scale of the electric steamer of FIG. 1 in its operative environment showing details of the positioning of a frankfurter and a frankfurter bun in relationship to the electric steamer;

FIG. 3 is a sectional view taken generally along line 3—3 of FIG. 2 showing details of the electric steamer having the frankfurter and frankfurter bun positioned in operating steaming and steam-warming relationship therewith; and FIG. 4 is a sectional view taken generally along the line 4—4 of FIG. 3 showing details of the interior of the electric steamer without the frankfurter and frankfurter bun.

DESCRIPTION OF THE PREFERRED EMBODIMENT

Referring now to the drawings and especially to FIG. 1, an electric steamer generally indicated by numeral 10 and embodying the present invention is shown therein. The electric steamer 10 has an open top base 14 adapted to rest on a substantially horizontal work surface, such as a table, kitchen counter, or the like. An elongated cup-shaped open top reservoir 16 is mounted on and partially seated within base 14. Reservoir 16 is adapted to receive and hold water for steaming a frankfurter and a frankfurter bun. A perforated support rack 18 is selectively engageable with an upper edge of the reservoir 16 for holding the frankfurter above the water in reservoir 16 for steaming. A removable cover 20 removably seats on the reservoir 16 and when so seated defines a steam chamber 22 within which the frankfurter is steamed. Removable cover 20 has a bun-supporting top wall 24 which can hold the frankfurter bun for simultaneous steam-warming with the frankfurter.

Referring now to FIGS. 3 and 4, base 14 in this embodiment is composed of a phenolic plastic, although one skilled in the art could also employ other material, and includes a flat bottom 26 having a pair of substantially flat rectangular legs 28, respectively numbered 30 and 32 formed integral therewith. Flat bottom 26 is open at an aperture 34 which receives a grommet 36. An electric power cord 38 is fitted through grommet 36, which grips the cord to form a strain relief.

A pair of recessed walls 40 is formed integral with flat bottom 26 at opposite ends of the base 14. The recessed walls 40 are also formed integral with a first semi-cylindrical exterior end wall 42 and a second semi-cylindrical exterior end wall 44. Flat bottom 26 is also formed integral with a first rectangular longitudinal side wall 46 and a second rectangular longitudinal side wall 48 positioned parallel to wall 46. Thus, base 14 is elongated and has a horizontal cross-sectional configuration which is larger than but generally similar to the horizontal cross-sectional configuration of a frankfurter. The distance between the semi-cylindrical walls 42 and 44 is substantially greater than the distance between side walls 46 and 48. Walls 42, 44, 46, and 48 terminate at a continuous stepped rim 49 which is adapted for sealing engagement with reservoir 16. Recessed walls 40, side walls 46 and 48, and end walls 42 and 44 substantially define a plurality of downwardly opening recesses 50, two of which recesses are shown in FIG. 4. Each recess 50 is adapted to receive a screw 52 whereby to secure reservoir 16 to base 14.

Reservoir 16 has a trough-like configuration with a peripheral lip 53 in sealing engagement with stepped rim 49 of base 14 and a pair of depending bosses 54 formed integral with a bottom wall 56 of the reservoir.

As previously set forth herein, screws 52 threadedly engage the bosses 54 which are provided with internally threaded bores 57, thereby securing reservoir 16 to base 14. Bottom wall 56 curves upwardly into a pair of integral inclined end walls 58 having integral arcuate liquid level fill lines 59 formed integral therewith and a pair of integral inclined side walls 60 which diverge from the bottom wall 56. Liquid level fill lines 59, in this embodiment, define approximately a one ounce fill volume for the reservoir 16.

A hanger post 61 is formed integral with the outside of reservoir side wall 60. A machine screw 62 threadedly engages hanger 61 and secures a mounting plate 63 to the hanger. A sheathed tubular resistance heating element 64 is staked to reservoir 16 in an integral partial sleeve 65 which is positioned on the outside of bottom wall 56. A plurality of folded over projections 66 hold heating element 64 firmly within partial sleeve 65 in good heat transfer relation therewith. Heating element 64 is electrically connected to power cord 38 to receive alternating current for heating reservoir 16 and water placed therein. A fusible link 68 is electrically connected to the sheathed heater 64 to prevent accidental overheating. A conventional thermostat 69 seated in a heat resistant electric insulating spiral paper sleeve 70 is held by hanger 61 between bottom wall 56 and mounting plate 63. Thermostat 70 opens at about 127° C. to prevent overheating of said reservoir, for instance after the water is dissipated, while allowing the resistance heater 64 to provide sufficient heat to the reservoir to steam a frankfurter and steam-warm a frankfurter bun.

Walls 58 and 60 terminate at an upper continuous elongated annular rack support ledge 71 adjacent peripheral lip 53. Reservoir 16 in this embodiment is composed of cast aluminum and has a silicone release coating of the type sold under the trademark MICOLON IV by Midland Divsion of the Dexter Corporation covering exposed portions of the reservoir well although one skilled in the art could substitute other materials as well. The coating promotes ease of cleaning and maintenance.

Perforated support rack 18 is, in this embodiment, composed of stamped aluminum although other materials could be employed by one skilled in the art, and has a dihedral angle or crease 72 between a first rectangular portion 74 and a second rectangular portion 76. A first row or plurality of identical circular perforations 80 is formed in rack half 76. A second row or plurality of identical circular perforations 82 is positioned at the dihedral crease 72. A third row or plurality of perforations 84 is provided in rack half 74. Perforated rack 18 is creased, as best shown in FIG. 3 in order to support a food stuff, such as a frankfurter 88 or a sausage in proximity with reservoir 16 so that the water in reservoir 16, which is heated, is converted into steam or vapor which flows around and steam-cooks frankfurter 88.

Cover 20 is adapted to rest in sealing engagement on lip 53 of reservoir 16 to define, with reservoir 16, the steam chamber 22. Cover 20, in this embodiment, is composed of a transparent clear polycarbonate plastic which allows the person using the electric steamer 10 to observe frankfurter 88 as it cooks. However, other materials could also be employed by one skilled in the art. Cover 20 includes a pair of parallel longitudinal rectangular side walls, respectively numbered 90 and 92, which are formed integral with a pair of semi-cylindrical arcuate end walls, respectively numbered 94 and 96.

The bottom edge portions of longitudinal walls 90 and 92 and arcuate walls 94 and 96 define a continous flange 97 and adjacent edge 98. Flange 97 sealingly engages reservoir lip 53 and holds edge 98 out of contact with rack 72 and ledge 71. Top wall 24 is formed integral with and substantially perpendicular to side and end walls 90, 92 94 and 96. Top wall 24 has a smooth interior surface 100 and a frosted exterior surface 102. Three collinearly-positioned steam vent slots 104 are formed in top wall 22. The slots 104, including a first steam vent slot 106, a second steam vent slot 108, and a third steam vent slot 110 are elongated and have rounded ends. The slots 104 are positioned midway between longitudinal walls 90 and 92.

A pair of generally rectangular upstanding spreader ribs, respectively numbered 112 and 114, is formed integral with the top wall 24. Spreader ribs 112 and 114 extend upward from top wall 24 and are equidistantly spaced about and positioned parallel with steam vent 108. An annular wall or rim 116 is formed integral and vertically flush with side and end housing walls 90, 92, 94 and 96. Annular wall 116 is characterized by a pair of longitudinal side wall sections 118 and 120 which terminate in arcuate end wall sections 122 and 124. The upper edge of rim 116 and ribs 112 and 114 are coplanar and positioned the same distance above wall 24. A sliced frankfurter bun 126 is held partially open with one-half portion 128 positioned between rib 112 and side wall 118 and the other half portion 130 positioned between rib 114 and side wall 120. Thus, the sliced frankfurter bun 126 is held open at a relatively small angle in a straddling attitude over steam vents 104 so that steam vapor which has heated frankfurter 88 flows through steam vents 104 and is trapped between the half portions 128 and 130 of the bun to steam-warm and moisten the bun 126. This is particularly advantageous since only a relatively small amount of water is available for steam-warming the bun. All of the vapor is directed to the highly porous center portion 132 of the bun for contact therewith rather than the crust portion 134 where less absorption and steam warming would occur.

Steamer 10 is both easy to use and clean. To prepare the frankfurter and bun, approximately one ounce of water is poured into reservoir 16. Support rack 18 is then positioned on flange 70 of reservoir 16 with a frankfurter or frankfurters 88 placed thereon. Cover 20 is seated on the reservoir 16 enclosing the frankfurters in steam chamber 22. Frankfurter bun 126 is simultaneously softened and warmed when it is positioned on the cover 20 above the frankfurter 88 so that steam or vapor which is cooking frankfurter or frankfurters 88 escapes through steam vents 104 and flows into the space defined by the partially open bun 126 and top wall 24. After cooking is completed, cover 20 is easily cleaned by submerging it in warm water and detergent and washing in a conventional manner since it is composed of polycarbonate plastic. Perforated support rack 18 is also cleaned in the same manner. Reservoir 16 is washed and rinsed out and the steamer is ready for use again or for storage.

It can be appreciated that one particular advantage of the present invention lies in the fact that the electric steamer is compact and cooks only one or two frankfurters at a time, so that it is particularly convenient for preparing a snack or meal for only one or two persons. Its compact construction provides an enclosed steam chamber for steam cooking a frankfurter or sausage and a vented cover which allows simultaneous steam-warming of the bun or similar breadstuff to soften, warm and provide more flavor thereto.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

What is claimed as new and desired to be secured by Letters Patent of the United States is:

1. An electric steamer for steaming a frankfurter and simultaneously steam-warming a frankfurter bun, said steamer comprising, a base supportable on a work surface, an open-topped reservoir mounted on said base, electrical heating means disposed in said base in proximity with said reservoir for heating a quantity of liquid disposed in said reservoir, means for supporting a frankfurter above the liquid in said reservoir, and a cover mountable on said base over said reservoir to define a steaming chamber therewith, said cover being formed with an upper supporting surface on which a bun may be supported exterior to and above said steaming chamber, said cover having means for venting steam for steam-warming a bun supported thereon whereby said heating means converts said liquid into steam which passes upwardly through said chamber out said venting means against a bun supported on said cover.

2. A steamer as defined in claim 1 wherein said vented cover is provided with means for retaining a sliced hot dog bun in an inverted, somewhat open attitude over said means for venting steam to maximize the steam-warming thereof.

3. A steamer as defined in claim 1 wherein said frankfurter-supporting means comprises a perforate rack supported on said reservoir for receiving a frankfurter.

4. A steamer as defined in claim 3 wherein said vented cover is provided with means for retaining a sliced frankfurter bun in an inverted, somewhat open attitude over said means for venting steam.

5. A steamer as defined in claim 1 wherein said reservoir has a pair of longitudinal side walls, a pair of substantially semi-cylindrical end walls and a bottom wall.

6. A steamer as defined in claim 1 wherein said frankfurter supporting means comprises a perforate rack having a dihedral angle and being supported on said reservoir for receiving a frankfurter.

7. A steamer as defined in claim 1 wherein the means for venting steam comprises a plurality of steam vents.

8. A steamer as defined in claim 11 wherein each steam vent of said plurality is an elongated steam vent slot.

9. An electric steamer for steaming a frankfurter and simultaneously steam-warming a frankfurter bun, said steamer comprising, a base supportable on a work surface, an open-topped reservoir mounted on said base, electrical heating means disposed in said base in proximity with said reservoir for heating a quantity of liquid disposed in said reservoir, means for supporting a frankfurter above the liquid in said reservoir, and a bun-supporting cover mountable on said base over said reservoir to define a steaming chamber therewith, said cover having means for venting steam for steam-warming a sliced hot dog bun in an inverted somewhat open attitude over said means for venting steam to maximize the steam-warming thereof with said sliced hot dog bun being retained between a rim and raised spreader means formed interiorly of said rim.

10. A steamer as defined in claim 3 wherein said raised spreader means comprises a pair of parallel spaced-apart upstanding ribs.

11. A steamer as defined in claim 9 wherein said raised rim is formed about the periphery of an upper wall of said cover and said raised spreader means is formed at the center of said upper wall of said cover.

12. A steamer as defined in claim 11 wherein said raised spreader means comprises a pair of parallel spaced-apart upstanding ribs.

13. An electric steamer for steaming a frankfurter and simultaneously steam-warming a frankfurter bun, said steamer comprising, a base supportable on a work surface, an open-topped reservoir mounted on said base, electrical heating means disposed in said base in proximity with said reservoir for heating a quantity of liquid disposed in said reservoir, means for supporting a frankfurter above the liquid in said reservoir, and a bun-supporting cover mountable on said base over said reservoir to define a steaming chamber therewith, said cover having a pair of parallel spaced-apart rectangular spreader ribs formed integral with a top wall, means for venting steam being defined by a plurality of aligned elongated steam vent slots positioned substantially parallel with and substantially midway between said spreader ribs, and a raised rim formed integral with the top wall about its periphery and extending substantially the same distance above said top wall as said spreader ribs, said spreader ribs and said rim being adapted to hold said bun partially open in a straddling attitude over said plurality of elongated steam vents for steam-warming said bun.

14. An electric steamer for steaming a frankfurter and simultaneously steam-warming a frankfurter bun, said steamer comprising, a base supportable on a work surface and forming an upwardly opening receptacle, a cup-shaped shallow elongated open-topped reservoir is partially received in said upwardly opening receptacle, said reservoir having a peripherally disposed lip which engages said base to form a closed chamber, an electric heater disposed in said chamber in good heat transfer relationship with said reservoir for heating a quantity of liquid disposed in said reservoir, and a cover mountable on said reservoir to define a steaming chamber therewith, said cover being formed with an upper supporting surface on which a bun may be supported exterior to and above said steaming chamber, in an open position to expose the interior thereof, said cover having means for venting steam into the interior of said frankfurter bun whereby said heating means converts said liquid into steam which passes upwardly through said chamber out said venting means against the bun support on said cover.

15. An electric steamer for steaming a frankfurter and simultaneously steam-warming a frankfurter bun, said steamer comprising, a base supportable on a work surface and forming an upwardly opening receptacle, a cup-shaped elongated open-topped reservoir is partially received in said upwardly opening receptacle, said reservoir having a peripherally disposed lip which engages said base to form a closed chamber, an electric heater disposed in said chamber in good heat transfer relationship with said reservoir for heating a quantity of liquid disposed in said reservoir, and a cover mountable on said reservoir to define a steaming chamber therewith, means on said cover for supporting a frankfurter bun in an open position to expose the interior thereof, said means for supporting said bun including a rim and raised spreader means formed interiorly of said rim, said frankfurter bun being held between said rim and said spreader means, said cover having means for venting steam into the interior of said frankfurter bun supported on said cover for steam-warming said bun.

16. A steamer as defined in claim 15 wherein said spreader means comprises a pair of parallel spaced-apart upstanding ribs and said means for venting steam comprises a plurality of elongated steam vents positioned between said parallel spaced-apart upstanding ribs.

17. An electric steamer for steaming a frankfurter and simultaneously steam-warming a frankfurter bun, said steamer comprising, an elongated phenolic base having a flat bottom wall, a pair of upstanding longitudinally substantially rectangular side walls formed integral with said flat bottom wall, a pair of semi-cylindrical end walls formed integral with said flat bottom wall and each of said longitudinal side walls, the distance between said end walls being substantially greater than the distance between said longitudinal side walls, said base forming an upwardly opening receptacle, a cup-shaped elongated open-topped plastic coated aluminum reservoir is partially received in said upwardly opening receptacle, said reservoir having a peripherally disposed lip which engages said base to form a closed base chamber, an electric heater disposed in said base chamber in good heat transfer relationship with a bottom wall of said reservoir for heating a quantity of liquid disposed in said reservoir, and an exterior cover mountable on said base over said reservoir to define a steaming chamber therewith, said cover being formed with an upper supporting surface on which a bun may be supported exterior to and above said steaming chamber, said cover having means for venting steam for steam-warming a bun supported thereon whereby said heater converts said liquid into steam which passes upwardly through said chamber out said venting means against a bun supported on said cover.

18. An electric steamer for steaming a frankfurter and simultaneously steam-warming a frankfurter bun, said steamer comprising, an elongated phenolic base having a flat bottom wall, a pair of upstanding longitudinal substantially rectangular side walls formed integral with said flat bottom wall, a pair of semi-cylindrical cylindrical end walls formed integral with said flat bottom wall and each of said longitudinal side walls, the distance between said end walls being substantially greater than the distance between said longitudinal side walls, said base forming an upwardly opening receptacle, a cup-shaped elongated open-topped plastic coated aluminum reservoir is partially received in said upwardly opening receptacle, said reservoir having a peripherally disposed lip which engages said base to form a closed base chamber, an electric heater disposed in said base chamber in good heat transfer relationship with a bottom wall of said reservoir for heating a quantity of liquid disposed in said reservoir, a cover mountable on said base over said reservoir to define a steaming chamber therewith said cover comprising a pair of parallel spaced-apart rectangular spreader ribs formed integral with a top wall thereof, said cover having means for venting steam for steam-warming a bun supported thereon, the means for venting steam being defined by a plurality of aligned elongated steam vent slots positioned substantially parallel with and substantially midway between said spreader ribs, and a raised rim formed integral with the top wall about its periphery and extending substantially the same distance above said top wall as said spreader ribs, said spreader ribs and said rim being adapted to hold said bun partially open in a straddling attitude over said plurality of elongated steam vents for steam-warming said bun.

19. A steamer as defined in claim 18 wherein said spreader ribs and said rim are spaced to hold said frankfurter bun partially open at a relatively small angle in a straddling attitude over said plurality of elongated steam vents so that said steam flows through said vents into steam warming contact with a center porous portion of said frankfurter bun and is substantially trapped thereby.

* * * * *